(12) United States Patent
Fu et al.

(10) Patent No.: US 10,089,175 B2
(45) Date of Patent: Oct. 2, 2018

(54) QUEUING OF DECODING TASKS ACCORDING TO PRIORITY IN NAND FLASH CONTROLLER

(71) Applicant: Marvell World Trade Ltd., St. Michael (BB)

(72) Inventors: Bo Fu, Cupertino, CA (US); Wei Xu, Milpitas, CA (US); ChengKuo Huang, Sunnyvale, CA (US); Yaolong Gao, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 51 days.

(21) Appl. No.: 15/370,596

(22) Filed: Dec. 6, 2016

(65) Prior Publication Data
US 2017/0168895 A1 Jun. 15, 2017

Related U.S. Application Data

(60) Provisional application No. 62/266,193, filed on Dec. 11, 2015.

(51) Int. Cl.
*G11C 29/00* (2006.01)
*G06F 11/10* (2006.01)
*G06F 3/06* (2006.01)

(52) U.S. Cl.
CPC ........ *G06F 11/1072* (2013.01); *G06F 3/0619* (2013.01); *G06F 3/0655* (2013.01); *G06F 3/0688* (2013.01); *G06F 11/1016* (2013.01)

(58) Field of Classification Search
CPC .. G06F 11/1072; G06F 3/0688; G06F 3/0619; G06F 3/0655; G06F 11/1016;
(Continued)

(56) References Cited

U.S. PATENT DOCUMENTS 5,822,772 A * 10/1998 Chan .................. G11C 7/22
                                                      711/158
7,010,654 B2 * 3/2006 Blackmon ........... G06F 13/1631
                                                      711/105

(Continued)

OTHER PUBLICATIONS

Caspi, E., "Hardware Queues," University of California, Berkeley, Apr. 8, 2005, retrieved from brass.cs.berkeley.edu/documents/eylon_thesis/queues.pdf.

*Primary Examiner* — Guerrier Merant (57) ABSTRACT

Apparatus, for performing decoding tasks in a NAND Flash memory controller, includes a first task queue for queuing decoding tasks of a first priority, a second task queue for queuing decoding tasks of a second priority higher than the first priority, and control circuitry that, on receipt of portions of data for a plurality of decoding tasks, releases, from the first and second task queues, respective decoding tasks to operate on respective portions of data, according to priorities of the decoding tasks. First and second decoders operate under first and second decoding schemes that differ in speed or complexity. Input switching circuitry controllably connects each data channel to the first or second decoder. Decoder-done control circuitry selects output of the first or second decoder upon receipt of a decoder-done signal from the first or second decoder. Completed decoding tasks are queued in first and second task-done queues according to priority.

19 Claims, 5 Drawing Sheets

(58) Field of Classification Search
CPC .............. G06F 3/0644; G06F 11/1068; G06F 12/0246; G06F 2212/7202; G06F 11/1092; G06F 3/064; G06F 3/067; G06F 3/065; G06F 2211/1028; G11C 7/22; H04L 1/0052
See application file for complete search history.

(56) References Cited

U.S. PATENT DOCUMENTS

| | | | |
|---|---|---|---|
| 9,092,156 B1 | 7/2015 | Xu et al. | |
| 2005/0097265 A1* | 5/2005 | Shrader | G06F 13/1668 711/105 |
| 2010/0080303 A1* | 4/2010 | Suzuki | H04N 19/44 375/240.25 |
| 2011/0213945 A1* | 9/2011 | Post | G06F 3/0644 711/173 |
| 2012/0134449 A1* | 5/2012 | Chen | H04L 1/0052 375/340 |
| 2013/0232392 A1* | 9/2013 | Grube | G06F 11/1044 714/766 |
| 2013/0263147 A1* | 10/2013 | Zhang | G06F 3/061 718/103 |
| 2016/0154698 A1* | 6/2016 | Kazi | G06F 11/1092 714/766 |

* cited by examiner

QUEUING OF DECODING TASKS ACCORDING TO PRIORITY IN NAND FLASH CONTROLLER

CROSS REFERENCE TO RELATED APPLICATION

This claims the benefit of commonly-assigned U.S. Provisional Patent Application No. 62/266,193, filed Dec. 11, 2015, which is hereby incorporated by reference herein in its entirety.

FIELD OF USE

Implementations of the subject matter of this disclosure generally pertain to a method, and apparatus, for assigning decoding tasks, in a NAND Flash controller, to different queues according to their priority, including use of different decoders for tasks of different priorities.

BACKGROUND

The background description provided herein is for the purpose of generally presenting the context of the disclosure. Work of the inventor hereof, to the extent the work is described in this background section, as well as aspects of the description that may not otherwise qualify as prior art at the time of filing, are neither expressly nor impliedly admitted to be prior art against the present disclosure.

Multi-level cell (MLC) NAND Flash memory is becoming popular as its cost per unit of data storage decreases relative to the cost of single-level cell (SLC) NAND Flash memory. However, because more than one bit of information is stored in each cell, MLC NAND Flash memory also experiences a higher raw bit error rate than SLC NAND Flash memory.

In order to meet reliability requirements, more advanced error correction schemes may be used in MLC NAND Flash memory devices than in SLC NAND Flash memory devices. However, the complexity of advanced error correction schemes, such as read-retry decoding and soft-decision decoding, can increase the latency of NAND Flash memory data access operations. The effect of data access latency will differ for different applications. For example, some critical operations, such as host data read, may require relatively low memory access latency, while other operations such as some background operations—e.g., data accesses for garbage collection—may be less sensitive to the degree of latency.

SUMMARY

Apparatus, for performing decoding tasks in a NAND Flash memory controller, includes a first task queue for queuing decoding tasks of a first priority, a second task queue for queuing decoding tasks of a second priority higher than the first priority, and control circuitry that, on receipt of portions of data for a plurality of decoding tasks, releases, from the first and second task queues, respective decoding tasks in the plurality of decoding tasks, to operate on respective ones of the portions of data, according to priorities of the respective decoding tasks in the plurality of decoding tasks.

In such apparatus, where the NAND Flash memory controller includes a plurality of memory channels, the apparatus may further include a respective first task queue for each respective channel in the plurality of channels, and a respective second task queue for each respective channel in the plurality of channels. At least one first decoder may operate under a first error-correcting code decoding scheme, and at least one second decoder may operate under a second error-correcting code decoding scheme that differs in one or both of speed and complexity from the first error-correcting code decoding scheme. Input switching circuitry controllably connects each data channel to one of the first decoder and the second decoder. The control circuitry includes a respective channel task control block for each respective channel for releasing decoding tasks from the respective first and second task queues for that respective channel, to control the input switching circuitry to direct respective data for the respective channel to one of the first decoder and the second decoder.

In such an implementation, the at least one first decoder includes a plurality of first decoders, the at least one second decoder includes a plurality of second decoders, and the input switching circuitry includes a respective demultiplexer for each respective channel for selectably directing data on the respective channel to one of the plurality of first decoders and the plurality of second decoders, a first switch for directing demultiplexer outputs for the plurality of first decoders to available ones of the plurality of first decoders, and a second switch for directing demultiplexer outputs for the plurality of second decoders to available ones of the plurality of second decoders.

Such an implementation also may further include a respective buffer for each respective channel for holding data received on that respective channel until a decoding task corresponding to the data is released from one of the first task queue and the task second queue.

Such an implementation also may further include output switching circuitry for outputting output of the one of the first decoder and the second decoder. In such an implementation, the control circuitry includes decoder-done control circuitry that selects the output of the one of the first decoder and the second decoder upon receipt of a decoder-done signal from the one of the first decoder and the second decoder. Such an implementation may further include a first task-done queue for queuing completed decoding tasks of the first priority, and a second task-done queue for queuing completed decoding tasks of the second priority, where the decoder-done control circuitry loads each completed decoding task into one of the first task-done queue and the second task-done queue, and the control circuitry further includes decoder-done status control circuitry that reports completed decoding tasks from the first and second task-done queues according to priorities of the completed decoding tasks.

Such an apparatus may further include a buffer for holding data received from NAND Flash memory until a decoding task corresponding to the data is released from one of the first task queue and the task second queue.

Such an apparatus may further include a first task-done queue for queuing completed decoding tasks of the first priority, and a second task-done queue for queuing completed decoding tasks of the second priority, where the control circuitry reports completed decoding tasks from the first and second task-done queues according to priorities of the completed decoding tasks.

A method for performing decoding tasks in a NAND Flash memory controller may include queuing decoding tasks of a first priority in a first task queue, queuing decoding tasks of a second priority higher than the first priority in a second task queue, and on receipt of portions of data for a plurality of decoding tasks, releasing, from the first and second task queues, respective decoding tasks in the plurality of decoding tasks, to operate on respective ones of the portions of data, according to priorities of the respective decoding tasks in the plurality of decoding tasks.

In one implementation of such a method, where the NAND Flash memory controller includes a plurality of memory channels, the queuing decoding tasks of a first priority may include queuing decoding tasks in a respective first task queue for each respective channel in the plurality of channels, and the queuing decoding tasks of a second priority may include queuing decoding tasks in a respective second task queue for each respective channel in the plurality of channels. The method may further include controllably connecting each data channel to one of a first decoder operating under a first error-correcting code decoding scheme and a second decoder operating under a second error-correcting code decoding scheme that differs in one or both of speed and complexity from the first error-correcting code decoding scheme.

In such an implementation, the controllably connecting may include controllably connecting each data channel to one of a plurality of first decoders operating under the first error-correcting code decoding scheme and a plurality of second decoders operating under the second error-correcting code decoding scheme.

Such an implementation may further include, for each respective channel, holding data received on that respective channel in a buffer until a decoding task corresponding to the data is released from one of the first task queue and the task second queue.

Such an implementation also may further include queuing completed decoding tasks of the first priority in a first task-done queue, queuing completed decoding tasks of the second priority in a second task-done queue, and reporting completed decoding tasks from the first and second task-done queues according to priorities of the completed decoding tasks.

Such a method may further include holding data received from NAND Flash memory in a buffer until a decoding task corresponding to the data is released from one of the first task queue and the task second queue.

An implementation of such a method may further include queuing completed decoding tasks of the first priority in a first task-done queue, queuing completed decoding tasks of the second priority in a second task-done queue, and reporting completed decoding tasks from the first and second task-done queues according to priorities of the completed decoding tasks.

In such an implementation, the reporting completed decoding tasks from the first and second task-done queues according to priorities of the completed decoding tasks may include reporting all completed decoding tasks of the second priority before reporting any completed decoding tasks of the first priority. The implementation may further include changing priority level of a completed decoding task from the first priority to the second priority following a predetermined duration after the queuing of the completed decoding task in the first task-done queue.

In such an implementation, the reporting completed decoding tasks from the first and second task-done queues according to priorities of the completed decoding tasks may include reporting a task from the first task-done queue following reporting of a predetermined number of tasks from the second task-done queue.

In an implementation of such a method, the releasing, from the first and second task queues, respective decoding tasks in the plurality of decoding tasks, to operate on respective ones of the portions of data, according to priori-ties of the respective decoding tasks in the plurality of decoding tasks, may include releasing all decoding tasks of the second priority before releasing any decoding tasks of the first priority.

Such an implementation may further include changing priority level of a decoding task from the first priority to the second priority following a predetermined duration after the queuing of the decoding task in the first task queue.

In such a method, the releasing, from the first and second task queues, respective decoding tasks in the plurality of decoding tasks, to operate on respective ones of the portions of data, according to priorities of the respective decoding tasks in the plurality of decoding tasks, may include releasing a task from the first task queue following releasing of a predetermined number of tasks from the second task queue.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, MLC NAND Flash memory may experience a higher raw bit error rate than SLC NAND Flash memory. Therefore, in order to meet reliability requirements, more advanced error correction schemes may be used in MLC NAND Flash memory devices than in SLC NAND Flash memory devices. However, the complexity of advanced error correction schemes, such as read-retry decoding and soft-decision decoding, can increase the latency of NAND Flash memory data access operations.

Because the effect of data access latency will differ for different applications as noted above, according to implementations of this disclosure, memory access operations of different priorities may be treated differently. In addition, a trade-off may be recognized between using a more complex and time-consuming decoding scheme that is more likely to succeed on the first try, and using a simpler and faster decoding scheme that may occasionally fail and require more than one attempt.

On balance, overall throughput may be maximized by using the simpler and faster decoding scheme for most memory access operations, even though an occasional failure may occur necessitating a retry operation, while using a more complex and time-consuming decoding scheme for higher-priority decoding tasks.

In addition, under a "cut-in-line" feature, a higher-priority decoding task may be performed before a normal-priority decoding task, even if the higher-priority decoding task is initiated later.

Implementations of the subject matter of this disclosure may be understood with reference to FIGS. 1-6.

Figure 1:
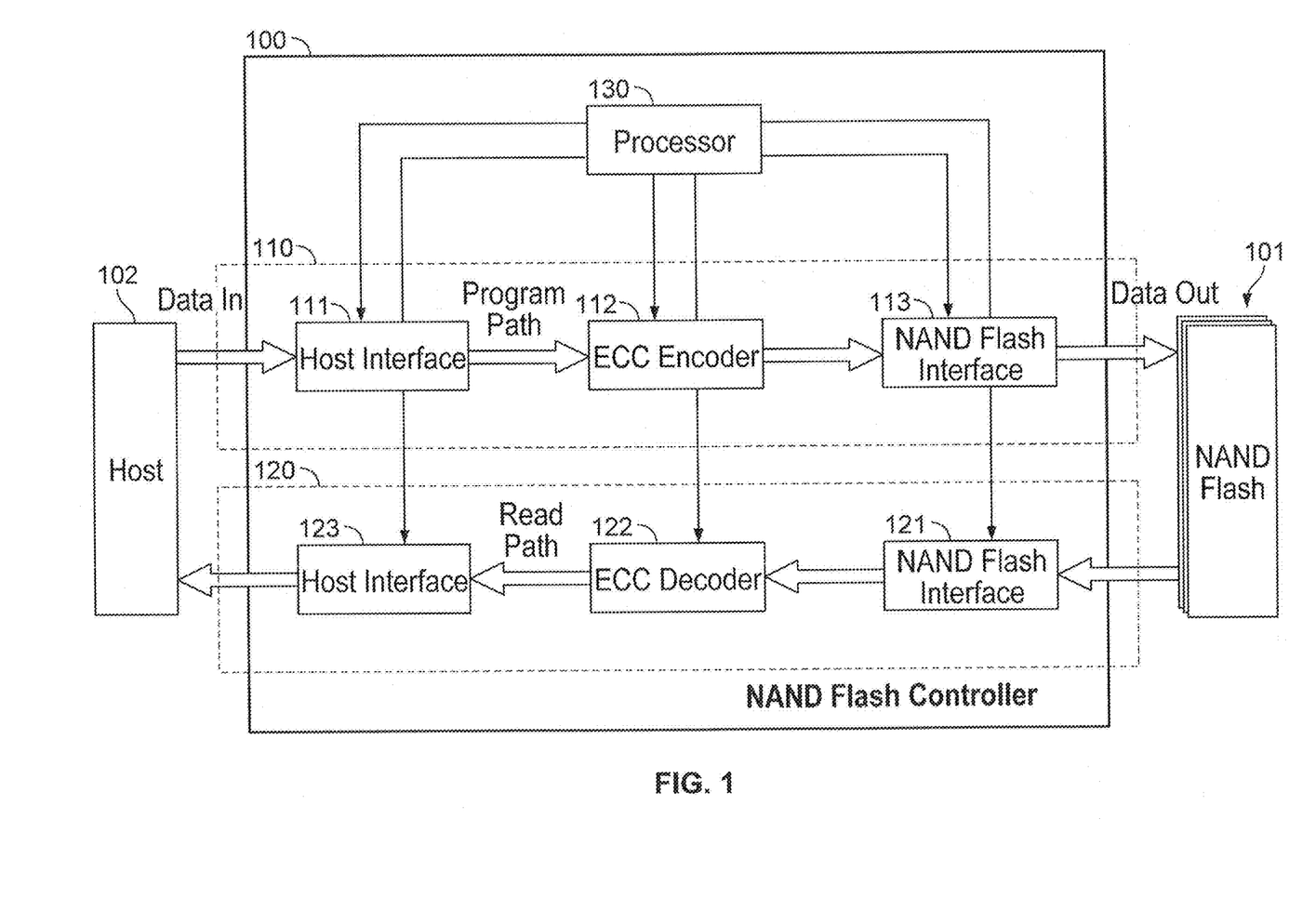
FIG. 1 shows a block diagram of a NAND Flash controller in which implementations of the present disclosure may be used.

FIG. 1 shows a NAND Flash controller 100 between one or more NAND Flash memory devices 101 and a host device 102. NAND Flash controller 100 includes a "program," or write, path 110 along which data from host device 102 may be written to NAND Flash memory device(s) 101, and a read path 120 along which data may be read from NAND Flash memory device(s) 101 by host device 102. Write path 110 includes a host interface 111 which receives data in a host format, an encoder 112 to convert the data received by host interface 111 in the host format to a format used by NAND Flash memory device(s) 101, and a NAND Flash interface 113 to transfer the encoded data to NAND Flash memory device(s) 101. Similarly, read path 120 includes a NAND Flash interface 121 which receives data from NAND Flash memory device(s) 101 in the format used by NAND Flash memory device(s) 101, a decoder 122 to convert the data received by NAND Flash interface 121 in the format used by NAND Flash memory device(s) 101 to a format used by host device 102, and a host interface 123 to transfer the decoded data to host device 102. A processor 130, which may be a microprocessor, controls the operation of the various components of write path 110 and read path 120.

Encoder 112 and decoder 122 are complementary—i.e., encoder 112 and decoder 122 use complementary versions of the same scheme for encoding and decoding data, so that data received from host device 102, and encoded by encoder 112 for storage on NAND Flash memory device(s) 101, can be decoded by decoder 122 after being read back from NAND Flash memory device(s) 101. Commonly, and in the implementations discussed herein, such an encoding/decoding scheme is an error-correcting code (ECC), so that the data can be reconstructed even after errors in the writing or reading processes.

Figure 2:
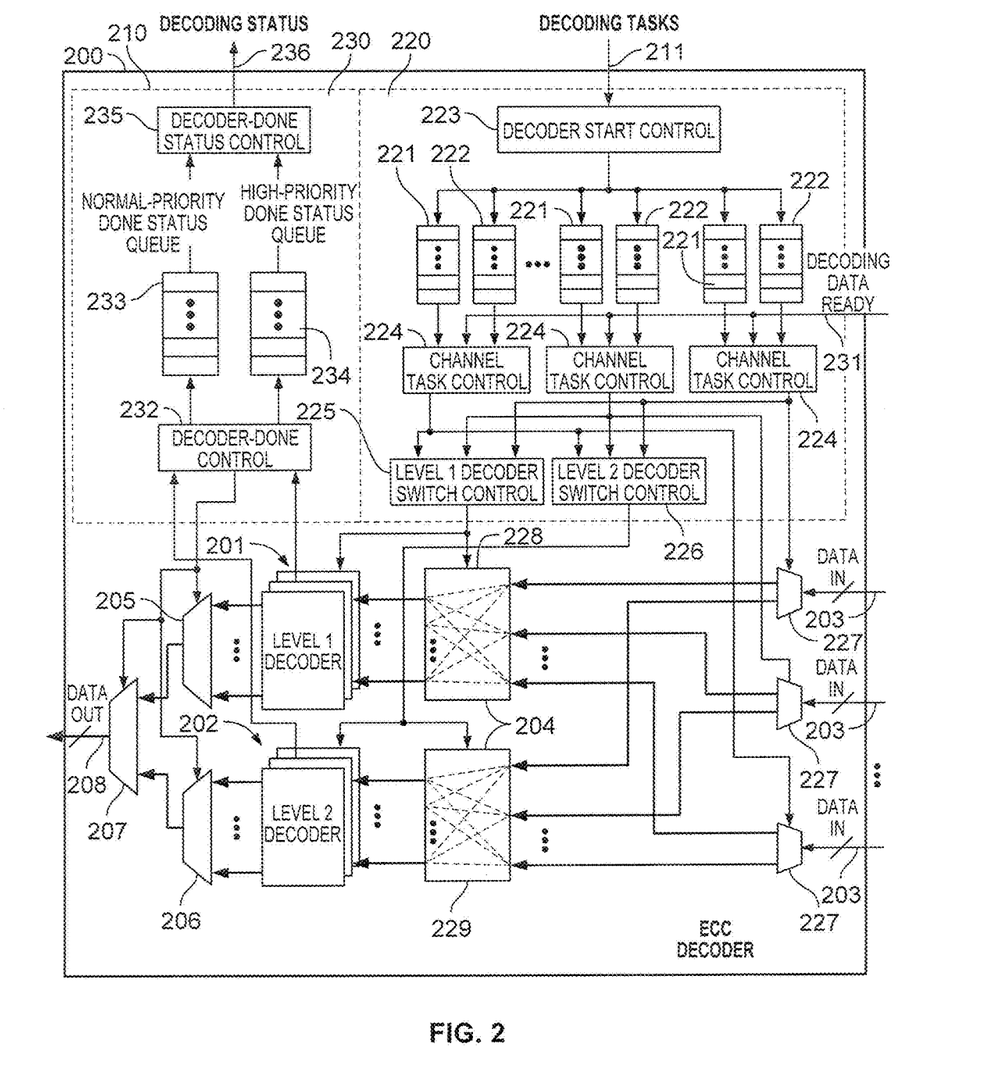
FIG. 2 shows a block diagram of the structure of an error-correcting code decoder, according to an implementation of the subject matter of this disclosure, that may be used in a NAND Flash controller.

FIG. 2 shows details of an implementation 200, according to this disclosure, of ECC decoder 122. ECC decoder 200 includes a first plurality, n, of decoder circuits 201, and a second plurality, m, of decoder circuits 202. Each of decoder circuits 201 may implement a relatively simpler and faster error-correcting decoding scheme than the error-correcting decoding scheme implemented by each of decoder circuits 202, while each of decoder circuits 202 may implement a relatively more complex and time-consuming error-correcting decoding scheme than the error-correcting decoding scheme implemented by each of decoder circuits 201. Generally, there will likely be more of decoder circuits 201 implementing the relatively simpler and faster error-correcting decoding scheme than there are decoder circuits 202 implementing the relatively more complex and time-consuming error-correcting decoding scheme—i.e., generally it may be expected that n>m, although there may be implementations in which m>n. The relatively simpler and faster error-correcting decoding scheme may be referred to as "Level1," while the relatively more complex and time-consuming error-correcting decoding scheme may be referred to as "Level2."

Data received on channels 203 from NAND Flash interface 121 is directed to decoder circuits 201 or decoder circuits 202 by switch circuits 204 under control of processor 130 as discussed further below. Similarly, decoded data from decoder circuits 201 or decoder circuits 202 is transferred to host interface 123 at 208 by n:1 multiplexer 205, m:1 multiplexer 206 and 2:1 multiplexer 207, as discussed further below.

Processor 130 controls switch circuits 204, as discussed above, via decoding task control block 210, which includes a decoding-task-start portion 220 and a decoding-task-complete portion 230.

Decoding-task-start portion 220 of decoding task control block 210 includes a respective pair of decoding task queues 221, 222 for each data channel 203. Within each pair of decoding task queues 221, 222, one decoding task queue (e.g., decoding task queue 221) is a normal-priority task queue, while the other decoding task queue (e.g., decoding task queue 222) is a high-priority task queue. Decoder start control 223 distributes incoming decoding tasks 211 from processor 130 to the appropriate pair of decoding task queues 221, 222 according to the data channel 203 to which the decoding task 211 applies, as determined based on, e.g., a task-ID field. Each pair of decoding task queues 221, 222 feeds a respective channel task control block 224. Each channel task control block 224 passes tasks (including at least the task-ID and data concerning priority) to Level1 decoder switch control block 225 and Level2 decoder switch control block 226, and also controls data-in demultiplexer 227 to can route incoming data on channels 203 to either Level1 decoder switch 228 or Level2 decoder switch 229.

Processor 130 sends a read request, corresponding to each decoding task 211, to NAND Flash memory device(s) 101 via NAND Flash interface 121. Each read request has the same task-ID as its corresponding decoding task 211. When the corresponding data is returned by NAND Flash interface 121 from NAND Flash memory device(s) 101, a Decoding Data Ready signal is sent, at 231, by NAND Flash interface 121 to channel task control blocks 224, identifying, by task-ID, the data being returned.

That one of channel task control blocks 224 that owns the task identified by the received task-ID—i.e., that one of channel task control blocks 224 associated with that one of channels 203 on which the data has been returned—will select the identified task from either queue 221 or 222 (according to the priority of the task) associated with that one of channels 203. That one of channel task control blocks 224 will then pass the task to either Level1 decoder switch control block 225 or Level2 decoder switch control block 226, to activate either Level1 decoder switch 228 or Level2 decoder switch 229 to route the data to be decoded from the incoming channel 203 to an available one of either the n Level1 decoder circuits 201 or the m Level2 decoder circuits 202, respectively, according to the priority of the task. At the same time, that one of channel task control blocks 224 also will activate that one of data-in demultiplexers 227 on the appropriate channel 203 to route the data to the activated one of Level1 decoder switch 228 or Level2 decoder switch 229.

After the data is routed to one of the n Level1 decoder circuits 201 or the m Level2 decoder circuits 202, as appropriate, the data will be decoded by that one of the n Level1 decoder circuits 201 or the m Level2 decoder circuits 202. After decoding is complete, the Level1 decoder circuit 201 or the Level2 decoder circuit 202, as the case may be, will send a completion signal to decoding-task-complete portion 230 of decoding task control block 210. The completion signal will be received by decoder-done-control block 232, which will cause multiplexer 205 (in the case of one of the n Level1 decoder circuits 201), or multiplexer 206 (in the case of one of the m Level2 decoder circuits 202) to select the correct one of decoder circuits 201 or 202, and also will cause multiplexer 207 to select multiplexer 205 in the case of one of the n Level1 decoder circuits 201) or multiplexer 206 (in the case of one of the m Level2 decoder circuits 202) for outputting at 208 to host interface 123.

In addition to controlling multiplexers 205, 206, 207 to select the correct output at 208, decoding-task-complete portion 230 of decoding task control block 210 also notifies processor 130 when a decoding task is complete. For example, for any completed task, decoder-done-control block 232 may output the task-ID of a completed task to either normal-priority done status queue 233 or high-priority done status queue 234, depending on the priority of the completed task. Decoder-done-status-control block 235 sends the completion indications from normal-priority done status queue 233 and high-priority done status queue 234 to processor 130 at 236.

Any completion indication in high-priority done status queue 234 relating to a high-priority task may be sent ahead of any completion indication in normal-priority done status queue 233. Alternatively, completion indications may be drawn from both normal-priority done status queue 233 and high-priority done status queue 234 in some predetermined order. For example, one completion indication may be drawn from normal-priority done status queue 233 after a certain number of completion indications have been drawn from high-priority done status queue 234, even if additional completion indications remain in high-priority done status queue 234. As another alternative, any completion indication in high-priority done status queue 234 relating to a high-priority task may be sent ahead of any completion indication in normal-priority done status queue 233, unless a completion indication has resided in normal-priority done status queue 233 for longer than a predetermined duration (which may be considered to change the priority of that completion indication to "high").

Returning to consideration of decoding-task-start portion 220 of decoding task control block 210, the selection of a task by one of channel task control blocks 224 from its respective low-priority task queue 221 and high-priority task queue 222 may be more complex than the selection of a completion indication from normal-priority done status queue 233 and high-priority done status queue 234, because, as noted above, a decoding task cannot be selected, regardless of its status, until the data associated with the task has been returned from NAND Flash memory device 101. One scheme for handling data access with different priorities in a NAND Flash memory controller is described in U.S. Pat. No. 9,092,156, which is hereby incorporated by reference herein in its entirety. However, other schemes may be used to prioritize the reading of data.

When the data has been read and is returned, NAND Flash interface 121 may include a signal to indicate the priority level associated with the data. If more than one decoding task remains to be processed, that signal indicating the priority will be used in selecting the decoding tasks, with the higher-priority decoding tasks in high-priority task queue 222 being given preference in selection over the normal-priority decoding tasks in normal-priority task queue 221.

Part of the selection involves routing the data to the correct decoder. If the decoding task being performed uses a Level1 decoder, it will be sent to Level1 decoder switch control block 225 with the assigned priority; otherwise it will be sent to Level2 decoder switch control block 226. Level1 decoder switch control block 225 and Level2 decoder switch control block 226 may be considered arbitration blocks. For example, tasks assigned to each of Level1 decoder switch control block 225 and Level2 decoder switch control block 226 may be distributed according to a weighted round robin arbitration.

As noted above, each Level1 decoder 201 may implement a relatively simpler and faster decoding scheme, while each Level2 decoder 202 may implement a relatively more complex and time-consuming decoding scheme. As a general matter, the Level1 decoding scheme may be used for normal-priority tasks, while the Level2 decoding scheme may be used for higher-priority tasks. However, in some implementations, there may be situations in which the Level1 decoding scheme is used for higher-priority tasks, just as there may be situations in which the Level2 decoding scheme is used for normal-priority tasks.

For example, if a task has higher priority because it is a read-retry task for a failed normal-priority task using the Level1 decoding scheme, then the read-retry attempt, notwithstanding its higher priority, may again use the Level1 decoding scheme. As another example, if a task has normal priority, and there are no Level1 decoders available but there are unused Level2 decoders, then a Level2 decoder may be used notwithstanding the task's normal priority. One such example may involve data that is not latency-critical, such as a garbage collection task, where Level1 decoding fails; using the slower Level2 decoding for a second attempt would leave a Level1 decoder available for latency-critical data. There may be other scenarios in which the Level1 decoding scheme is used for higher-priority tasks or the Level2 decoding scheme is used for normal-priority tasks.

Figure 3:
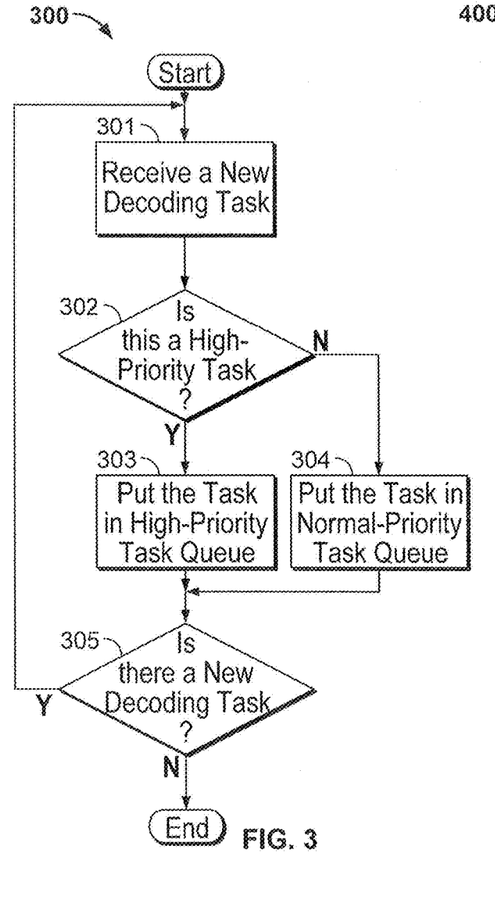
FIG. 3 is a flow diagram of a process, according to an implementation of the subject matter of this disclosure, by which decoding task queues for each data channel in the decoder of FIG. 2 may be populated.
Figure 4:
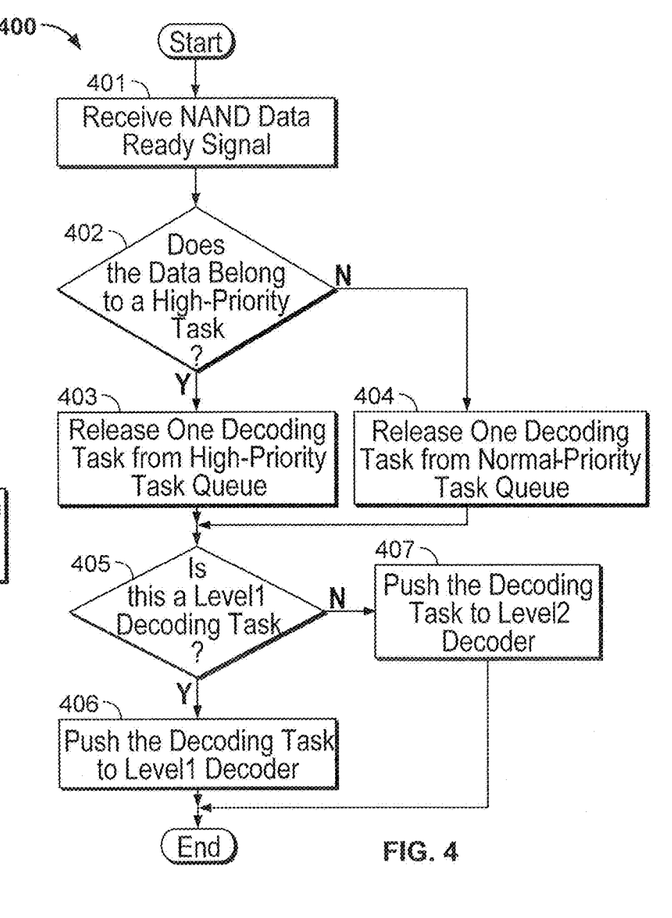
FIG. 4 is a flow diagram of a process, according to an implementation of the subject matter of this disclosure, for selecting a task for execution from one of a normal-priority task queue or a high-priority task queue.
Figure 5:
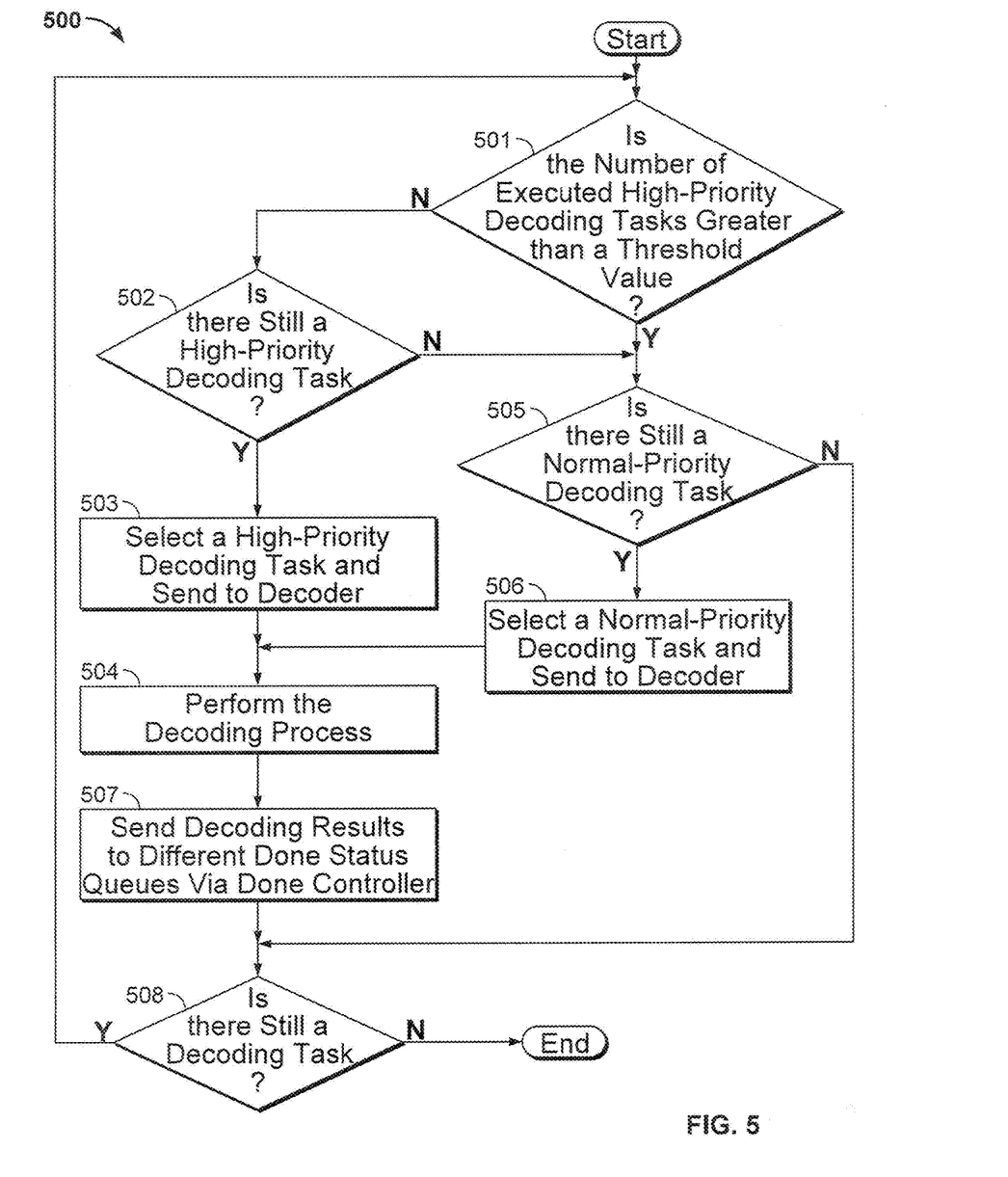
FIG. 5 is a flow diagram showing the operation of a set of rules, according to an implementation of the subject matter of this disclosure, for selecting between normal-priority decoding tasks and higher-priority decoding tasks.

Operation of ECC decoder 200 may be better understood with reference to the flow diagrams in FIGS. 3-5.

FIG. 3 is a flow diagram showing an implementation of a process 300 by which the decoding task queues 221, 222 for each data channel 203 are populated, according to an embodiment. A new decoding task for the channel in question is received at 301. At 302, it is determined whether or not the task received at 301 is a high-priority task. If the task received at 301 is determined at 302 to be a high-priority task, then at 303, the task is placed in the high-priority task queue 222 for that channel. However, if at 302 the received task is determined not to be a high-priority task, then at 304, the task is placed in the normal-priority task queue 221 for that channel. At 305, it is determined whether there is any further decoding task for the channel. If at 305 it is determined that there is no further decoding task for the channel, then process 300 ends. But if at 305 it is determined that there is a further decoding task for the channel, then process 300 returns to 301 to receive the new decoding task.

FIG. 4 is a flow diagram showing an implementation of a process 400 for selecting a task for execution from one of normal-priority task queue 221 or high-priority task queue 222. At 401, a NAND Data Ready signal is received—e.g., on one of channels 203, indicating that data has been returned—e.g., in response to a request—from NAND Flash memory device 101. At 402, it is determined whether the data that has been returned belongs to a high-priority task (as noted above, a Task-ID may be returned with the data). If so, at 403 the associated task is released from high-priority task queue 222 of the corresponding channel 203. Otherwise, if at 402 it is determined that the data that has been returned does not belong to a high-priority task, then at 404 the associated task is released from normal-priority task queue 221 of the corresponding channel 203.

As noted above, the choice of decoder is not necessarily determined by the priority level of a task. While most high-priority tasks will be Level2 decoder tasks, and most normal-priority tasks will be Level1 decoder tasks, there may be exceptions. Therefore, once a task has been released to be performed, at 405 it is determined whether the task is a Level1 decoding task. If so, at 406 the task is directed to a Level1 decoder (via an appropriate channel task control block and an appropriate decoder switch control block) and process 400 ends. Otherwise, if at 405 it is determined that the task is not a Level1 decoding task, then at 407 the task is directed to a Level2 decoder and process 400 ends.

The actual order of release of tasks from queues 221, 222 may be controlled according to predetermined rules. Therefore, if data is returned, but is associated with a task that has lower priority (i.e., a normal-priority task) than another task for which data also has been returned, the data may be kept in a buffer (not shown) until the task is ready to be performed.

According to one possible set of rules, high-priority tasks will always have precedence over normal-priority tasks. According to a variant of that set of rules, excessive dwell time (beyond a predetermined limit) in the normal-priority queue causes a task to be moved into the high-priority queue. According to another possible set of rules, one normal-priority task is performed for every p high-priority tasks that are performed, which makes excessive dwell time in the normal-priority queue less likely. A combination of those rule sets could be used, in which one normal-priority task is performed for every p high-priority tasks that are performed, but excessive dwell time in the normal-priority queue (which should be rare) causes a task to be moved from the normal-priority queue to the higher-priority queue. Other sets of rules may be developed.

An example 500 of one possible such set of rules is diagrammed in FIG. 5. At 501 it is determined whether the number of high-priority tasks that have been executed (since a counter was last reset) exceeds a threshold. If not, then at 502 it is determined whether there are any high-priority tasks waiting in the high-priority task queue. If so, then at 503 a high-priority task is selected and sent to the proper decoder (e.g., see FIG. 4), where the selected task is performed at 504. If at 502 it is determined that there are no high-priority tasks waiting in the high-priority task queue, or at 501 it is determined that the number of high-priority tasks that have been executed (since a counter was last reset) does exceed a threshold, then at 505 it is determined whether there are any normal-priority tasks waiting in the normal-priority task queue. If so, then at 506 a normal-priority task is selected and sent to the proper decoder (e.g., see FIG. 4), where the selected task is performed at 504.

Figure 6:
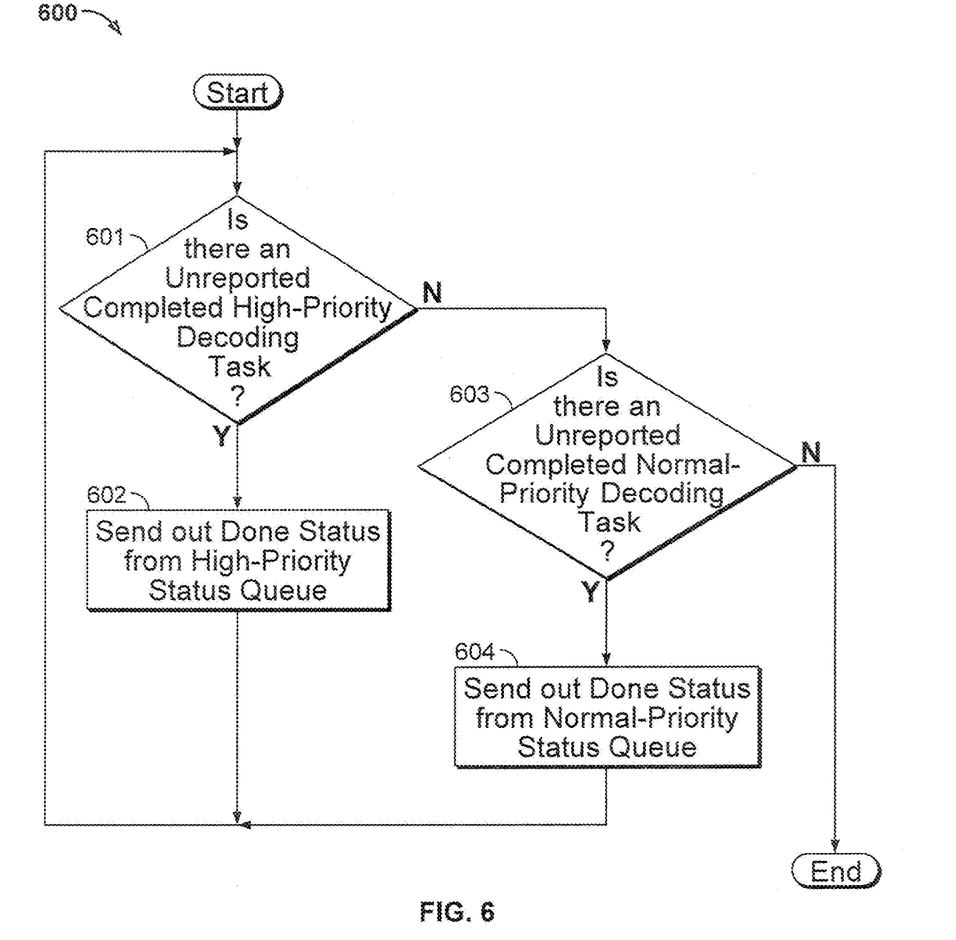
FIG. 6 is a flow diagram showing a process, according to an implementation of the subject matter of this disclosure, for reporting completion of decoding tasks.

After the selected task has been performed at 504 (whether it was a high-priority task or a normal-priority task), at 507 the results are sent to done status queues 233, 234 for reporting as shown, e.g., in FIG. 6. After results have been reported, or if at 505 it is determined that there are no normal-priority tasks waiting in the normal-priority task queue, it is determined at 508 whether any tasks remain to be performed. If so, flow returns to 501. If at 508 it is determined that no tasks remain to be performed, then process 500 ends.

FIG. 6 is a flow diagram showing an implementation of one possible process 600 for reporting completion of decoding tasks. At 601 it is determined whether there are any unreported completed high-priority decoding tasks (e.g., in high-priority done status queue 234). If so, notice of the next completed high-priority task is reported at 602 and flow returns to 601 to look for more unreported completed decoding tasks. If at 601 it is determined that that there are no unreported completed high-priority decoding tasks, then at 603 it is determined whether there are any unreported completed normal-priority decoding tasks (e.g., in normal-priority done status queue 233). If so, notice of the next completed normal-priority task is reported at 604 and flow returns to 601 to look for more unreported completed high-priority decoding tasks. If at 603 it is determined that that there are no unreported completed normal-priority decoding tasks, then process 600 ends. It should be noted, however, that other sets of reporting rules, similar to the various possible sets of rules set forth above for releasing tasks from queues 221, 222, also may apply to the reporting of completion of tasks.

Thus it is seen that decoding apparatus, and corresponding methods, are provided in which overall throughput may be maximized by using the simpler and faster decoding scheme for most memory access operations, even though an occasional failure may occur necessitating a retry operation, while using a more complex and time-consuming decoding scheme for higher-priority decoding tasks. It also is seen that under a "cut-in-line" feature, a higher-priority decoding task may be performed before a normal-priority decoding task, even if the higher-priority decoding task is initiated later although, as noted above, if a normal-priority task has to wait too long because of later-arriving higher-priority tasks, the normal-priority task may itself increase in priority.

Further aspects of the present invention relate to one or more of the following clauses:

Clause 1: Apparatus for performing decoding tasks in a NAND Flash memory controller, the apparatus comprising:

a first task queue for queuing decoding tasks of a first priority;

a second task queue for queuing decoding tasks of a second priority higher than the first priority; and control circuitry that, on receipt of portions of data for a plurality of decoding tasks, releases, from the first and second task queues, respective decoding tasks in the plurality of decoding tasks, to operate on respective ones of the portions of data, according to priorities of the respective decoding tasks in the plurality of decoding tasks.

Clause 2: The apparatus of clause 1 wherein the NAND Flash memory controller includes a plurality of memory channels, and wherein the apparatus further comprises:

a respective first task queue for each respective channel in the plurality of channels, and a respective second task queue for each respective channel in the plurality of channels;

at least one first decoder operating under a first error-correcting code decoding scheme;

at least one second decoder operating under a second error-correcting code decoding scheme that differs in one or both of speed and complexity from the first error-correcting code decoding scheme; and input switching circuitry that controllably connects each data channel to one of the first decoder and the second decoder;

wherein the control circuitry comprises a respective channel task control block for each respective channel for releasing decoding tasks from the respective first and second task queues for that respective channel, to control the input switching circuitry to direct respective data for the respective channel to one of the first decoder and the second decoder.

Clause 3: The apparatus of clause 2 wherein: the at least one first decoder comprises a plurality of first decoders;

the at least one second decoder comprises a plurality of second decoders; and the input switching circuitry comprises:

a respective demultiplexer for each respective channel for selectably directing data on the respective channel to one of the plurality of first decoders and the plurality of second decoders, a first switch for directing demultiplexer outputs for the plurality of first decoders to available ones of the plurality of first decoders, and a second switch for directing demultiplexer outputs for the plurality of second decoders to available ones of the plurality of second decoders.

Clause 4: The apparatus of clause 2 further comprising a respective buffer for each respective channel for holding data received on that respective channel until a decoding task corresponding to the data is released from one of the first task queue and the task second queue.

Clause 5: The apparatus of clause 2 further comprising output switching circuitry for outputting output of the one of the first decoder and the second decoder; wherein:

the control circuitry comprises decoder-done control circuitry that selects the output of the one of the first decoder and the second decoder upon receipt of a decoder-done signal from the one of the first decoder and the second decoder.

Clause 6: The apparatus of clause 5 further comprising:

a first task-done queue for queuing completed decoding tasks of the first priority; and a second task-done queue for queuing completed decoding tasks of the second priority; wherein:

the decoder-done control circuitry loads each completed decoding task into one of the first task-done queue and the second task-done queue; and the control circuitry further comprises decoder-done status control circuitry that reports completed decoding tasks from the first and second task-done queues according to priorities of the completed decoding tasks.

Clause 7: The apparatus of clause 1 further comprising a buffer for holding data received from NAND Flash memory until a decoding task corresponding to the data is released from one of the first task queue and the task second queue.

Clause 8: The apparatus of clause 1 further comprising:

a first task-done queue for queuing completed decoding tasks of the first priority; and a second task-done queue for queuing completed decoding tasks of the second priority; wherein:

the control circuitry reports completed decoding tasks from the first and second task-done queues according to priorities of the completed decoding tasks.

Clause 9: A method for performing decoding tasks in a NAND Flash memory controller, the method comprising:

queuing decoding tasks of a first priority in a first task queue;

queuing decoding tasks of a second priority higher than the first priority in a second task queue; and on receipt of portions of data for a plurality of decoding tasks, releasing, from the first and second task queues, respective decoding tasks in the plurality of decoding tasks, to operate on respective ones of the portions of data, according to priorities of the respective decoding tasks in the plurality of decoding tasks.

Clause 10: The method of clause 9 wherein the NAND Flash memory controller includes a plurality of memory channels, and wherein:

the queuing decoding tasks of a first priority comprises queuing decoding tasks in a respective first task queue for each respective channel in the plurality of channels; and the queuing decoding tasks of a second priority comprises queuing decoding tasks in a respective second task queue for each respective channel in the plurality of channels; the method further comprising:

controllably connecting each data channel to one of a first decoder operating under a first error-correcting code decoding scheme and a second decoder operating under a second error-correcting code decoding scheme that differs in one or both of speed and complexity from the first error-correcting code decoding scheme.

Clause 11: The method of clause 10 wherein the controllably connecting comprises controllably connecting each data channel to one of a plurality of first decoders operating under the first error-correcting code decoding scheme and a plurality of second decoders operating under the second error-correcting code decoding scheme.

Clause 12: The method of clause 10 further comprising, for each respective channel, holding data received on that respective channel in a buffer until a decoding task corresponding to the data is released from one of the first task queue and the task second queue.

Clause 13: The method of clause 10 further comprising:

queuing completed decoding tasks of the first priority in a first task-done queue; and queuing completed decoding tasks of the second priority in a second task-done queue; and reporting completed decoding tasks from the first and second task-done queues according to priorities of the completed decoding tasks.

Clause 14: The method of clause 9 further comprising holding data received from NAND Flash memory in a buffer until a decoding task corresponding to the data is released from one of the first task queue and the task second queue.

Clause 15: The method of clause 9 further comprising:

queuing completed decoding tasks of the first priority in a first task-done queue; and queuing completed decoding tasks of the second priority in a second task-done queue; and reporting completed decoding tasks from the first and second task-done queues according to priorities of the completed decoding tasks.

Clause 16: The method of clause 15 wherein the reporting completed decoding tasks from the first and second task-done queues according to priorities of the completed decoding tasks comprises reporting all completed decoding tasks of the second priority before reporting any completed decoding tasks of the first priority.

Clause 17: The method of clause 16 further comprising changing priority level of a completed decoding task from the first priority to the second priority following a predetermined duration after the queuing of the completed decoding task in the first task-done queue.

Clause 18: The method of clause 15 wherein the reporting completed decoding tasks from the first and second task-done queues according to priorities of the completed decoding tasks comprises reporting a task from the first task-done queue following reporting of a predetermined number of tasks from the second task-done queue.

Clause 19: The method of clause 9 wherein the releasing, from the first and second task queues, respective decoding tasks in the plurality of decoding tasks, to operate on respective ones of the portions of data, according to priorities of the respective decoding tasks in the plurality of decoding tasks, comprises releasing all decoding tasks of the second priority before releasing any decoding tasks of the first priority.

Clause 20: The method of clause 19 further comprising changing priority level of a decoding task from the first priority to the second priority following a predetermined duration after the queuing of the decoding task in the first task queue.

Clause 21: The method of clause 9 wherein the releasing, from the first and second task queues, respective decoding tasks in the plurality of decoding tasks, to operate on respective ones of the portions of data, according to priorities of the respective decoding tasks in the plurality of decoding tasks, comprises releasing a task from the first task queue following releasing of a predetermined number of tasks from the second task queue.

As used herein and in the claims which follow, the construction "one of A and B" shall mean "A or B."

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. Apparatus for performing decoding tasks in a NAND Flash memory controller, wherein the NAND Flash memory controller includes a plurality of memory channels, the apparatus comprising:
    a respective first task queue in each respective channel in the plurality of channels for queuing decoding tasks of a first priority;
    a respective second task queue in each respective channel in the plurality of channels for queuing decoding tasks of a second priority higher than the first priority;
    at least one first decoder operating under a first error-correcting code decoding scheme;
    at least one second decoder operating under a second error-correcting code decoding scheme that differs in one or both of speed and complexity from the first error-correcting code decoding scheme;
    input switching circuitry that controllably connects each data channel to one of the first decoder and the second decoder; and
    control circuitry comprising a respective channel task control block for each respective channel for releasing decoding tasks from the respective first and second task queues for that respective channel, to control the input switching circuitry to direct respective data for the respective channel to one of the first decoder and the second decoder, wherein:
        on receipt of portions of data for a plurality of decoding tasks, the control circuitry releases, from the respective first and second task queues, respective decoding tasks in the plurality of decoding tasks, to operate on respective ones of the portions of data, according to priorities of the respective decoding tasks in the plurality of decoding tasks.

2. The apparatus of claim 1 wherein:
    the at least one first decoder comprises a plurality of first decoders;
    the at least one second decoder comprises a plurality of second decoders; and
    the input switching circuitry comprises:
        a respective demultiplexer for each respective channel for selectably directing data on the respective channel to one of the plurality of first decoders and the plurality of second decoders,
        a first switch for directing demultiplexer outputs for the plurality of first decoders to available ones of the plurality of first decoders, and
        a second switch for directing demultiplexer outputs for the plurality of second decoders to available ones of the plurality of second decoders.

3. The apparatus of claim 1 further comprising a respective buffer for each respective channel for holding data received on that respective channel until a decoding task corresponding to the data is released from one of the respective first task queue and the respective second task queue.

4. The apparatus of claim 1 further comprising output switching circuitry for outputting output of the one of the first decoder and the second decoder; wherein:
    the control circuitry comprises decoder-done control circuitry that selects the output of the one of the first decoder and the second decoder upon receipt of a decoder-done signal from the one of the first decoder and the second decoder.

5. The apparatus of claim 4 further comprising:
    a first task-done queue for queuing completed decoding tasks of the first priority; and
    a second task-done queue for queuing completed decoding tasks of the second priority; wherein:
    the decoder-done control circuitry loads each completed decoding task into one of the first task-done queue and the second task-done queue; and
    the control circuitry further comprises decoder-done status control circuitry that reports completed decoding tasks from the first and second task-done queues according to priorities of the completed decoding tasks.

6. The apparatus of claim 1 further comprising a buffer for holding data received from NAND Flash memory until a decoding task corresponding to the data is released from one of the respective first task queue and the respective second task queue.

7. The apparatus of claim 1 further comprising:
    a first task-done queue for queuing completed decoding tasks of the first priority; and
    a second task-done queue for queuing completed decoding tasks of the second priority; wherein:
    the control circuitry reports completed decoding tasks from the first and second task-done queues according to priorities of the completed decoding tasks.

8. A method for performing decoding tasks in a NAND Flash memory controller including a plurality of memory channels, the method comprising:
    queuing decoding tasks of a first priority in a respective first task queue for each respective channel in the plurality of channels;
    queuing decoding tasks of a second priority higher than the first priority in a respective second task queue for each respective channel in the plurality of channels;
    controllably connecting each data channel to one of a first decoder operating under a first error-correcting code decoding scheme and a second decoder operating under a second error-correcting code decoding scheme that differs in one or both of speed and complexity from the first error-correcting code decoding scheme; and
    on receipt of portions of data for a plurality of decoding tasks, releasing, from the respective first and second task queues, respective decoding tasks in the plurality of decoding tasks, to operate on respective ones of the portions of data, according to priorities of the respective decoding tasks in the plurality of decoding tasks.

9. The method of claim 8 wherein the controllably connecting comprises controllably connecting each data channel to one of a plurality of first decoders operating under the first error-correcting code decoding scheme and a plurality of second decoders operating under the second error-correcting code decoding scheme.

10. The method of claim 8 further comprising, for each respective channel, holding data received on that respective channel in a buffer until a decoding task corresponding to the data is released from one of the respective first task queue and the respective second task queue.

11. The method of claim 8 further comprising:
queuing completed decoding tasks of the first priority in a first task-done queue; and
queuing completed decoding tasks of the second priority in a second task-done queue; and
reporting completed decoding tasks from the first and second task-done queues according to priorities of the completed decoding tasks.

12. The method of claim 8 further comprising holding data received from NAND Flash memory in a buffer until a decoding task corresponding to the data is released from one of the respective first task queue and the respective second task queue.

13. The method of claim 8 further comprising:
queuing completed decoding tasks of the first priority in a first task-done queue; and
queuing completed decoding tasks of the second priority in a second task-done queue; and
reporting completed decoding tasks from the first and second task-done queues according to priorities of the completed decoding tasks.

14. The method of claim 13 wherein the reporting completed decoding tasks from the first and second task-done queues according to priorities of the completed decoding tasks comprises reporting all completed decoding tasks of the second priority before reporting any completed decoding tasks of the first priority.

15. The method of claim 14 further comprising changing priority level of a completed decoding task from the first priority to the second priority following a predetermined duration after the queuing of the completed decoding task in the first task-done queue.

16. The method of claim 13 wherein the reporting completed decoding tasks from the first and second task-done queues according to priorities of the completed decoding tasks comprises reporting a task from the first task-done queue following reporting of a predetermined number of tasks from the second task-done queue.

17. The method of claim 8 wherein the releasing, from the respective first and second task queues, respective decoding tasks in the plurality of decoding tasks, to operate on respective ones of the portions of data, according to priorities of the respective decoding tasks in the plurality of decoding tasks, comprises releasing all decoding tasks of the second priority before releasing any decoding tasks of the first priority.

18. The method of claim 17 further comprising changing priority level of a decoding task from the first priority to the second priority following a predetermined duration after the queuing of the decoding task in the first task queue.

19. The method of claim 8 wherein the releasing, from the respective first and second task queues, respective decoding tasks in the plurality of decoding tasks, to operate on respective ones of the portions of data, according to priorities of the respective decoding tasks in the plurality of decoding tasks, comprises releasing a task from the respective first task queue following releasing of a predetermined number of tasks from the respective second task queue.

\* \* \* \* \*